Dec. 24, 1957    L. F. HERMAN    2,817,566
FOLDABLE SERVICE TRAY FOR AUTOMOBILES
Filed Oct. 26, 1956
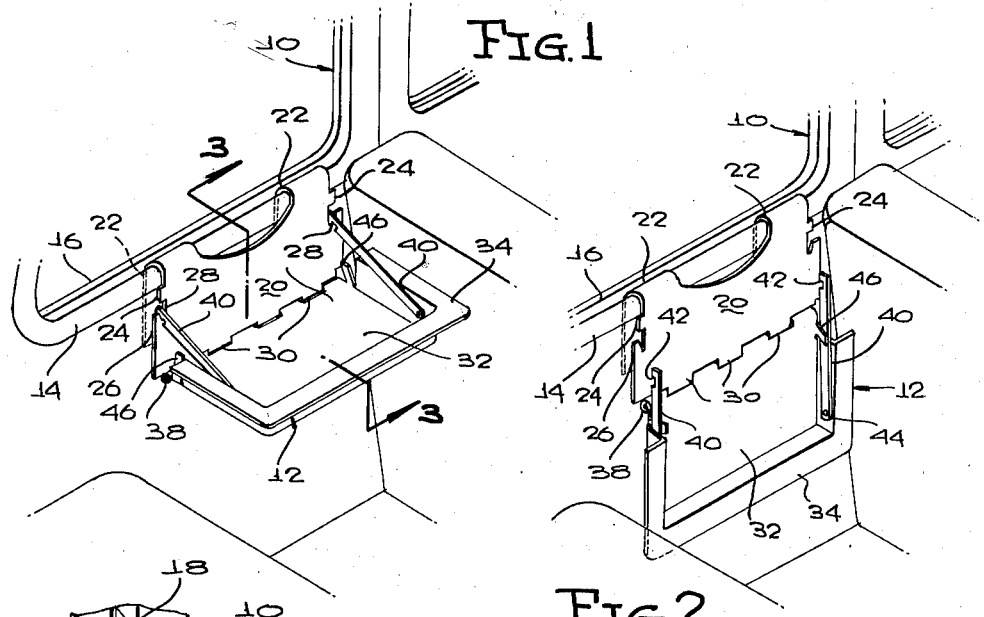
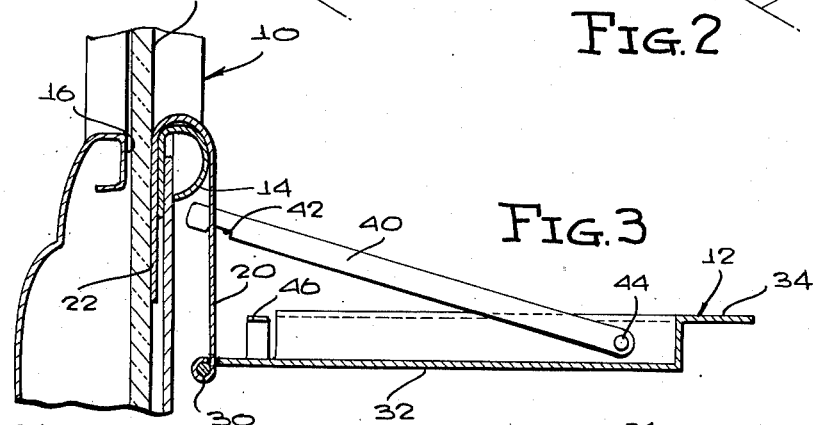
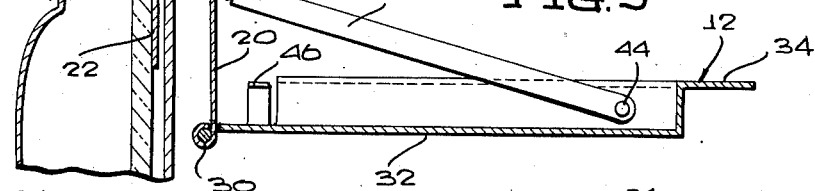
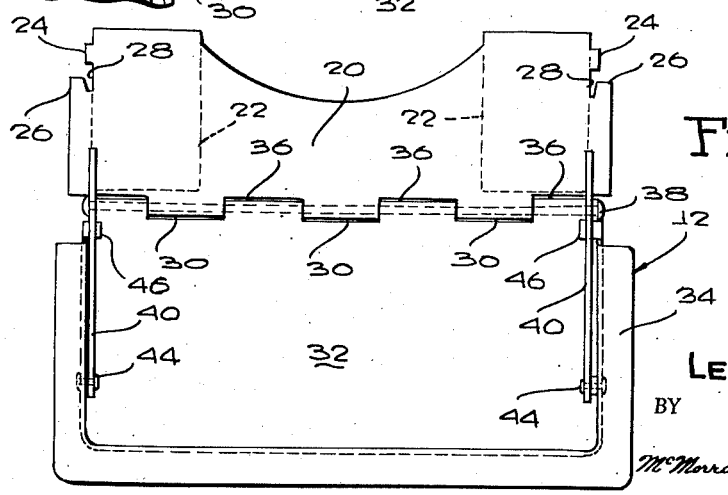
INVENTOR.
LEO F. HERMAN
BY
McMorrow, Berman + Davidson
ATTORNEYS

United States Patent Office 2,817,566
Patented Dec. 24, 1957

2,817,566

FOLDABLE SERVICE TRAY FOR AUTOMOBILES

Leo F. Herman, West Hollywood, Fla.

Application October 26, 1956, Serial No. 618,507

6 Claims. (Cl. 311—22)

This invention relates to service trays for automobiles, and more particularly has reference to an improved tray designed to be readily supported from the window molding of a vehicle, and swiftly adjusted between folded and use positions respectively.

The desirability of a tray of the character described is readily appreciated among vehicle owners, since in many instances, it may be desired to permit children or other passengers to partake of refreshments during long trips or in any other circumstances in which the vehicle is being used.

The main object of the present invention, accordingly, is to provide a generally improved device of this type, that can be employed to advantage by vehicle owners or, for that matter, by commercial establishments such as drive-in restaurants.

Another object is to provide a device of the character described which will have an improved means for locking the same both in use and folded positions.

A further object is to achieve the above-stated desirable characteristics in the foldable tray while still permitting manufacture of the same almost entirely from inexpensive sheet metal components.

Still another object is to form the tray in a manner such that it can be readily attached to the vehicle without requiring that the window of the vehicle be lowered.

Yet another object of importance is to form the device in a manner such that the tray, when folded, will lie wholly flat against the adjacent wall of the vehicle body, so as to represent a minimum amount of lateral projection from said wall.

A further object of importance is to provide a service tray of the character described which will be usable either in the front or in the rear portion of the passenger compartment of the vehicle, on any window molding of the vehicle.

Yet another object is to form the service tray in a manner such that it will be swiftly operable between use and collapsed positions respectively, and will provide a maximum amount of protection for the article supported therein.

Still another object is to form the tray in such a manner that it can be used on any conventional vehicles, without requiring modification or redesign of the vehicles in any way, and without damaging the surfaces of the vehicle with which the device is in contact.

Other objects will appear from the following description, the claims appended thereto, and from the annexed drawing, in which like reference characters designate like parts throughout the several views, and wherein:

Figure 1 is a fragmentary perspective view of a vehicle interior with the tray in a use position;

Figure 2 is a view like Figure 1 in which the tray has been folded to an inoperative position;

Figure 3 is an enlarged sectional view substantially on line 3—3 of Figure 1; and Figure 4 is an enlarged elevational view of the serving tray per se, in its folded or collapsed position.

A conventional vehicle has been illustrated, generally designated 10, with the serving tray constituting the present invention being generally designated at 12 and being shown suspended from the inner garnish mold 14 of one of the rear windows of the vehicle. The device can be used, of course, on any window, either in the front or rear of the vehicle. The illustrated window has the usual window channel 16 in which is vertically movable the glass 18. As will be seen from Figure 3, the serving tray 12 is so designed that it can be suspended within the vehicle while the glass is raised, with all portions of the device being disposed interiorly of the vehicle.

The foldable tray includes a support plate 20, integrally formed at its upper edge with outwardly, downwardly turned, flat arms 22 adapted to engage in the window channel 16, between the glass 18 and the garnish mold 14 as shown in Figure 3. On the respective side edges of the support plate 20 there are integrally formed outwardly projecting, generally rectangular ears 24, and below the ears 24 said side edges of the plate 20 are formed with lateral projections 26 extending outwardly a distance greater than the ears 24 as shown in Figure 4 and cooperating with the ears 24 in defining upwardly, outwardly opening notches 28.

It may be noted that the construction is such that between the ears 24, 26 laterally, outwardly opening recesses are defined, the lower walls of which project outwardly from the support plate a distance greater than the upper walls, due to the greater projection of the ears 26 as compared to the ears 24. At the inner ends of the recesses, the plate is formed with upwardly opening, generally vertical slots defining the notches 28, for a purpose to be made presently apparent.

Integrally formed upon the bottom edge of the plate 20 are aligned hinge sleeves 30, and a tray member 32 is hingedly suspended from the plate 20, said tray member being formed from a single piece of sheet metal material integrally formed on its opposite sides and along its front edge with an upwardly and outwardly directed flange 34 of inverted L-shape in cross section as shown in Figure 3.

The inner or back edge of the tray member 32 is formed with hinge sleeves 36 alternating with the sleeves 30 and extending through the several sleeves 30, 36 is a hinge pin 38 extending fully from side to side of the device. The tray member is thus pivoted upon the support plate 20 for swinging movement between opposite extreme positions angularly spaced 90 degrees apart, so that the tray member in one position extends horizontally, outwardly from the wall of the vehicle to support articles as shown in Figure 1, while depending vertically in a plane substantially common to that of the plate 20 when not in use.

A pair of support arms 40 is included in the device, said support arms being formed at one end with downwardly opening locking recesses 42, the other ends of the support arms being pivotally connected at 44 to the side portions of the flange 34.

When the tray member is swung upwardly to its Figure 1 position, the arms 40 are adapted to be shifted laterally inwardly through the outwardly opening recesses defined between ears 24, 26, so that when they have been shifted inwardly to the inner end of said recesses, they may move downwardly within the notches 28. The recesses 42 define shoulders on the support arms, adapted to bear against the inner end walls of the notches 28. The tray member is thus lockably engaged in its upwardly swung position, ready for use.

When the tray member is swung downwardly, the support arms 40 are disengaged from their notches, it being understood that the pivotal connections of the support arms to the tray member are loose enough to permit a certain amount of lateral displacement of the free ends of the support arms to permit the same to move into and out of the recesses and locking notches. Alternatively, the support arms can be of a slightly springable material to permit this lateral displacement thereof.

With the tray member swung downwardly to its Figure 2, inoperative position, the support arms are adapted to engage against the side portions of the flange 34. In this connection, at the inner ends of said side portions, transverse slits are formed therein, and the material of the flanges located rearwardly of the slits is bent inwardly to a slight extent as shown in Figures 1 and 2, to provide locking projections 46 extending upwardly from the bottom of the tray member in planes inclined relative to the path of swinging movement of the support arms 40. The planes of the locking projections are at acute angles to the planes of the side walls of the tray member, with the faces of the projections lying substantially in the planes of said side walls.

As a result, upwardly opening, wedge-shaped recesses are defined at opposite sides of the tray member, so located as to receive the support arms 40 when the tray member is lowered. The support arms are swung into said recesses, so as to wedge between the locking projections 46 and the side walls of the tray member, the side walls of the tray member being defined by the side portions of flange 34.

It will be seen that the construction is one that facilitates the adjustment of the device between operative and inoperative positions respectively, with the construction further having the desirable characteristic of permitting the locking arms to be swiftly engaged in their proper positions, in both the folded and use positions of the tray member. This is accomplished without use of any more than two pieces of metal material, so far as the support plate and tray members are concerned, with these two pieces providing the support plate, means for suspending the device from the garnish mold, the tray members, means for locking the support arms in their use position of Figure 1, and means for locking the support arms in their inoperative, collapsed positions of Figure 2.

The device has general utility in vehicles of various makes and body styles, and can be left in place at all times, if desired, without interfering with the normal use of a door on which it is mounted, or with the window. Most usually, the device would be suspended from the window mold when the vehicle is being used during a trip, under circumstances in which it would be employed for the purpose of permitting passengers to eat without leaving the vehicle. At other times, the device can be readily removed and can be collapsed and easily stored in a relatively small area within the vehicle.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A service tray for a vehicle, comprising a support plate; means on the support plate for suspending the same from a window mold of a vehicle; a tray member hingedly connected to the support plate to swing between a horizontal, use position and a vertical, inoperative position; support arms pivotally connected to the tray member at the sides thereof; means on the sides of the support plate engaging the support arms in the use position of the tray member for holding the tray member in said use position; and means on the tray member engaging the support arms in the inoperative position of the tray member with the support arms collapsed into the tray member, said means of the support plate comprising lateral projections integrally formed upon the support plate and cooperating to define outwardly opening recesses in which the support arms are engageable, said support plate being formed with upwardly opening notches communicating with said recesses and receiving the support arms following movement of the support arms into the recesses.

2. A service tray for a vehicle, comprising a support plate; means on the support plate for suspending the same from a window mold of a vehicle; a tray member hingedly connected to the support plate to swing between a horizontal, use position and a vertical, inoperative position; support arms pivotally connected to the tray member at the sides thereof; means on the sides of the support plate engaging the support arms in the use position of the tray member for holding the tray member in said use position; and means on the tray member engaging the support arms in the inoperative position of the tray member with the support arms collapsed into the tray member, said means of the support plate comprising lateral projections integrally formed upon the support plate and cooperating to define outwardly opening recesses in which the support arms are engageable, said support plate being formed with upwardly opening notches communicating with said recesses and receiving the support arms following movement of the support arms into the recesses, the support arms having downwardly opening recesses defining shoulders thereon engageable with the inner ends of the notches.

3. A service tray for a vehicle, comprising a support plate; means on the support plate for suspending the same from a window mold of a vehicle; a tray member hingedly connected to the support plate to swing between a horizontal, use position and a vertical, inoperative position; support arms pivotally connected to the tray member at the sides thereof; means on the sides of the support plate engaging the support arms in the use position of the tray member for holding the tray member in said use position; and means on the tray member engaging the support arms in the inoperative position of the tray member with the support arms collapsed into the tray member, comprising side walls on the tray member and projections extending upwardly from the bottom of the tray member adjacent the side walls, said projections being disposed at acute angles to the side walls to cooperate therewith in defining locking recesses in which the support arms are wedgeable in the folded position of the tray member.

4. A service tray for a vehicle, comprising: a vertical, stationary support plate adapted for suspension from a window mold of a vehicle and having opposite side edges each of which is formed with a laterally outwardly opening recess and with a vertically extending, narrow, upwardly opening notch communicating with the recess inwardly from the side edge in which the recess is formed; a tray member hingedly connected at one end to the bottom edge of the support plate for swinging movement between a horizontal use position in which the tray member projects forwardly from the support plate, and an inoperative position in which it extends downwardly from and is coplanar with the support plate; and a pair of support arms pivotally connected at one end to the tray member at opposite sides of and intermediate the respective ends of the member, for swinging movement about a common axis parallel to the hinge axis of the tray member, the other ends of the arms extending into the respective recesses and releasably engaging in the notches thereof in the use position of the member.

5. A service tray for a vehicle, comprising: a vertical, stationary support plate adapted for suspension from a window mold of a vehicle and having opposite side edges each of which is formed with a laterally outwardly opening recess and with a vertically extending, narrow, upwardly opening notch communicating with the recess inwardly from the side edge in which the recess is formed; a tray member hingedly connected at one end to the bottom edge of the support plate for swinging movement between a horizontal use position in which the tray member projects forwardly from the support plate, and an inoperative position in which it extends downwardly from and is coplanar with the support plate; and a pair of support arms pivotally connected at one end to the tray member at opposite sides of and intermediate the respective ends of the member, for swinging movement about a common axis parallel to the hinge axis of the tray member, the other ends of the arms extending into the respective recesses and releasably engaging in the notches thereof in the use position of the member, said tray member including side walls to which the arms are pivotally connected, the side walls lying in planes paralleling the planes of swinging movement of the respective arms in juxtaposition thereto, said member further including, in close proximity to the hinge axis of the tray member, locking projections extending at acute angles to the planes of the respective side walls forming V-shaped notches in cooperation with the respective side walls, said arms engaging frictionally in the last named notches in the inoperative position of the tray member, said arms, and the first and second named notches, all lying in a common plane.

6. A service tray for a vehicle, comprising: a vertical, stationary support plate adapted for suspension from a window mold of a vehicle and having opposite side edges each of which is formed with a laterally outwardly opening recess and with a vertically extending, narrow, upwardly opening notch communicating with the recess inwardly from the side edge in which the recess is formed; a tray member hingedly connected at one end to the bottom edge of the support plate for swinging movement between a horizontal use position in which the tray member projects forwardly from the support plate, and an inoperative position in which it extends downwardly from and is coplanar with the support plate; and a pair of support arms pivotally connected at one end to the tray member at opposite sides of and intermediate the respective ends of the member, for swinging movement about a common axis parallel to the hinge axis of the tray member, the other ends of the arms extending into the respective recesses and releasably engaging in the notches thereof in the use position of the member, said tray member including side walls to which the arms are pivotally connected, the side walls lying in planes paralleling the planes of swinging movement of the respective arms in juxtaposition thereto, said member further including, in close proximity to the hinge axis of the tray member, locking projections extending at acute angles to the planes of the respective side walls forming V-shaped notches in cooperation with the respective side walls, said arms engaging frictionally in the last named notches in the inoperative position of the tray member, said arms, and the first and second named notches, all lying in a common plane, the arms being shiftable laterally at their free ends out of said plane of swinging movement of the arms so as to be movable laterally into and out of said recesses.

References Cited in the file of this patent

UNITED STATES PATENTS

| | | |
|---|---|---|
| 1,232,874 | Whealen | July 10, 1917 |
| 1,817,056 | Belgard | Aug. 4, 1931 |
| 1,991,951 | Matchette | Feb. 19, 1935 |
| 2,211,962 | Morris | Aug. 20, 1940 |
| 2,503,602 | Titley | Apr. 11, 1950 |
| 2,533,147 | Sparks | Dec. 5, 1950 |
| 2,774,640 | Harmon et al. | Dec. 18, 1956 |